(12) United States Patent
Bowie et al.

(10) Patent No.: US 11,475,513 B2
(45) Date of Patent: Oct. 18, 2022

(54) STREAMLINE BANKING

(71) Applicant: Mastercard International Incorporated, Purchase, NY (US)

(72) Inventors: William Raymond Bowie, Lake St. Louis, MO (US); Regan E. Harmon, O'Fallon, MO (US); Christopher T. Scholl, Florissant, MO (US)

(73) Assignee: Mastercard International Incorporated, Purchase, NY (US)

( * ) Notice: Subject to any disclaimer, the term of this patent is extended or adjusted under 35 U.S.C. 154(b) by 283 days.

(21) Appl. No.: 16/724,867

(22) Filed: Dec. 23, 2019

(65) Prior Publication Data
US 2021/0192610 A1 Jun. 24, 2021

(51) Int. Cl.
*G06Q 30/00* (2012.01)
*G06Q 40/02* (2012.01)
*G06Q 30/02* (2012.01)
*G06Q 20/18* (2012.01)
*G06Q 20/32* (2012.01)
(Continued)

(52) U.S. Cl.
CPC .......... *G06Q 40/02* (2013.01); *G06K 7/1417* (2013.01); *G06Q 20/18* (2013.01); *G06Q 20/3221* (2013.01); *G06Q 20/3223* (2013.01); *G06Q 20/3274* (2013.01); *G06Q 20/36* (2013.01); *G06Q 30/016* (2013.01); *G06Q 30/0237* (2013.01); *H04W 12/03* (2021.01)

(58) Field of Classification Search
None
See application file for complete search history.

(56) References Cited

U.S. PATENT DOCUMENTS

| 2006/0149664 | A1* | 7/2006 | Smyth | G06Q 30/02 705/38 |
| 2007/0080214 | A1* | 4/2007 | Collas | G06Q 20/28 235/380 |

(Continued)

OTHER PUBLICATIONS

Citibank, N.A. "Shared Service Centers & In-House Banks: Trends in Treasury and Working Capital Management." Moderated Forum, The Financial Professionals Forum (2012).

(Continued)

*Primary Examiner* — Matthew T Sittner
(74) *Attorney, Agent, or Firm* — Hovey Williams LLP

(57) ABSTRACT

A streamline banking system includes a customer kiosk having a photographic element and a processor. The processor is programmed to capture an image with the photographic element and determine that the captured image comprises an image of a machine-readable code. The processor decodes the machine-readable code and extracts customer financial account data therefrom. The customer financial account data is associated with one or more financial institutions. The processor retrieves information associated with one or more financial product offerings offered by the financial institutions. Each of the financial institutions is presented to a customer along with the respective financial accounts and the respective financial product offerings. The customer selects one or more of the financial accounts and the financial product offerings. The customer kiosk then transmits to the customer service computing system the customer selection.

7 Claims, 9 Drawing Sheets

(51) Int. Cl.
*G06K 7/14* (2006.01)
*G06Q 20/36* (2012.01)
*H04W 12/03* (2021.01)

(56) References Cited

U.S. PATENT DOCUMENTS

| | | |
|---|---|---|
| 2007/0282943 A1 | 12/2007 | Rincones |
| 2008/0006685 A1 | 1/2008 | Rackley, III et al. |
| 2013/0073386 A1* | 3/2013 | Rose ................ G06Q 40/02 705/14.53 |
| 2013/0087050 A1* | 4/2013 | Studor ................ A47J 31/525 99/279 |
| 2014/0316918 A1* | 10/2014 | Zaniker ............ G06Q 20/347 705/21 |
| 2015/0046336 A1* | 2/2015 | Cummins .......... G06Q 20/3274 705/41 |
| 2018/0158051 A1* | 6/2018 | Arora ................ G06Q 20/401 |
| 2018/0204209 A1* | 7/2018 | Kohli ................ G06Q 20/363 |
| 2019/0026716 A1* | 1/2019 | Anbukkarasu ....... G06Q 20/389 |
| 2020/0082423 A1* | 3/2020 | Glazier .............. H04L 67/535 |
| 2020/0234277 A1* | 7/2020 | Dabney ............. G06Q 20/3224 |

OTHER PUBLICATIONS

Article from Co-Op Shared Branches entitled Benefits of Co-Op Shared Branches by Justin Pritchard (Mar. 12, 2019).
Printout of webpage for Fujitsu webpage for Keyo to integrate Fujitsu PalmSecure biometric technology in retail and hospitality payment solutions, https://www.fujitsu.com/us/about/resources/news/press-releases/2017/ffna-20170523.html (printed Feb. 28, 2019).
Printout of webpage for Fujitsu for Highly secure ATM transactions with PalmSecure at Bradesco, https://www.fujitsu.com/global/about/resources/case-studies/cs-banco-bradesco.html) (printed Feb. 28, 2019).

* cited by examiner

STREAMLINE BANKING

FIELD OF THE DISCLOSURE

The field of the disclosure relates generally to financial services and, more particularly, to a system enabling multiple financial accounts at a variety of financial institutions to be serviced at a single financial institution.

BACKGROUND OF THE DISCLOSURE

It is not uncommon for a consumer to have multiple financial accounts, such as checking, savings, loans, etc., at multiple financial institutions. Typically, in order for the consumer to speak with someone about these accounts or to take specific actions on the accounts, the consumer may be required to visit the financial institutions in person. The consumer would then have to travel to multiple financial institution locations to perform this service/inquiry in person. This results in lost time to the consumer. Additionally, financial institutions need to own or lease property and/or buildings to setup multiple physical locations that are convenient for their customers. Reducing the time needed by a consumer to service his or her accounts, and/or reducing the need for banks to spend large sums of funds to establish multiple physical locations would be beneficial to the consumer and the financial institutions.

BRIEF DESCRIPTION OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a streamline bank financial network system is provided. The system includes a database for storing information associated with one or more financial product offerings offered by one or more financial institutions. The system also includes a customer service computing system coupled to the database, and a customer kiosk coupled to the database and the customer service computing system. The customer kiosk includes a photographic element and a processor communicatively coupled to the photographic element. The processor is programmed to capture an image with the photographic element and to determine that the captured image comprises an image of a machine-readable code. The processor is further programmed to decode the machine-readable code to extract customer financial account data associated with one or more financial accounts of one or more financial institutions. Furthermore, the processor is programmed to retrieve from the database the information associated with one or more financial product offerings offered by the one or more financial institutions. The processor is programmed to present to the customer each of the one or more financial institutions, and for each of the one or more financial institutions, present to the customer the respective one or more financial accounts corresponding to the customer financial account data and the respective one or more financial product offerings. In addition, the processor is programmed to receive from the customer a selection of one or more of the financial accounts and the financial product offerings. Moreover, the processor is programmed to transmit to the customer service computing system the customer selection.

In another aspect, a streamline bank financial network system is provided. The system includes a database for storing information associated with one or more financial product offerings offered by one or more financial institutions, a customer service computing system coupled to the database, and a customer kiosk coupled to the database and the customer service computing system. The customer kiosk includes a photographic element, a communication device, and a processor communicatively coupled to the communication device and the photographic element. The processor is programmed to capture an image with the photographic element, and to determine that the captured image comprises an image of a machine-readable code. Furthermore, the processor is programmed to decode the machine-readable code to extract communication information associated with a customer mobile device. Using the extracted communication information, the processor establishes communication with the customer mobile device via the communication device. Moreover, the processor is programmed to retrieve, from the customer mobile device, customer financial account data associated with one or more financial accounts of one or more financial institutions. In addition, the processor is programmed to retrieve from the database the information associated with one or more financial product offerings offered by the one or more financial institutions. The processor is programmed to present to the customer each of the one or more financial institutions. For each of the one or more financial institutions, the processor presents to the customer a financial institution's respective one or more financial accounts corresponding to the customer financial account data and the respective one or more financial product offerings. Furthermore, the processor is programmed to receive from the customer a selection of one or more of the financial accounts and the financial product offerings. Additionally, the processor is programmed to transmit to the customer service computing system the customer selection.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
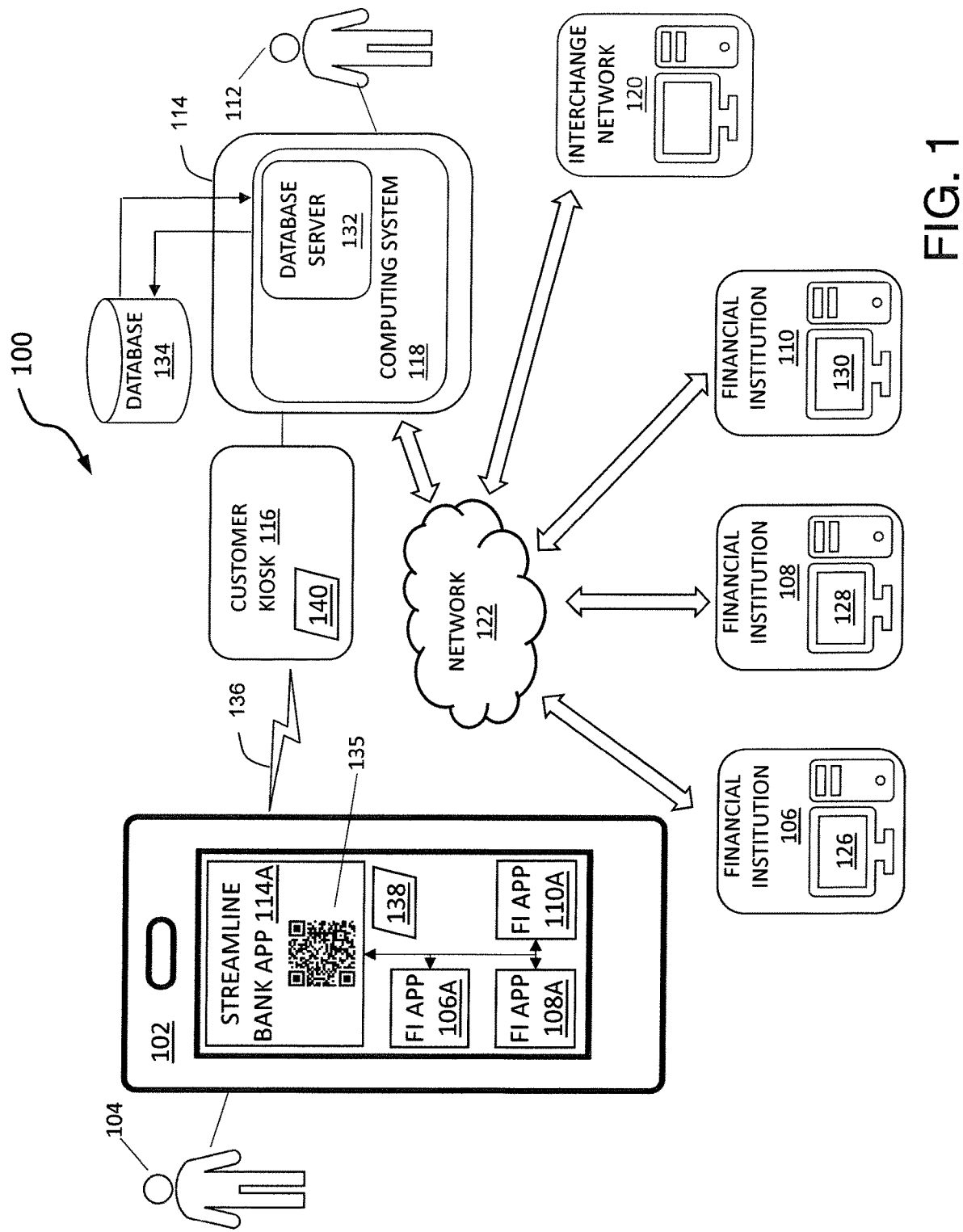
FIG. 1 is a simplified block diagram of an exemplary streamline bank financial network system including a customer mobile device belonging to a customer, in accordance with one embodiment of the present disclosure.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. It is contemplated that the invention has general application for enabling a customer to select and receive service for one or more of the customer's financial accounts at a single location. The scope of the present invention is defined only by the appended claims, along with the full scope of equivalents to which such claims are entitled. The term "financial account" includes any type of bank account, brokerage account, debit card and credit card account, mortgage account, loan account, and the like.

As used herein, the term "database" includes either a body of data, a relational database management system (RDBMS), or both. As used herein, a database includes, for example, and without limitation, a collection of data including hierarchical databases, relational databases, flat file databases, object-relational databases, object oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL. However, any database may be used that enables the systems and methods to operate as described herein.

Embodiments of the present technology relate to systems, methods, and computer-readable media for enabling a customer having one or more financial accounts with multiple financial institutions to receive customer service for any of the financial accounts at a single location. As such, the customer is able to select from his or her financial accounts, and/or select new financial products offered by their financial institutions, for discussion with a customer service representative at a single banking location, rather than needing to visit each of their financial institutions.

According to one embodiment of the disclosure, a computing system is configured to read a machine-readable code in which customer financial account data associated with one or more financial accounts is encoded. The computing system broadly includes a customer kiosk or other computing device having a camera and a processor programmed to communicate with a customer's mobile device and a bank computing device located at the banking location. The kiosk scans a machine-readable code presented by the customer's mobile device and decodes the code to establish communication with the customer's mobile device and/or extract the customer financial account data that may be encoded therein. After the financial account data is received by the kiosk, the kiosk proceeds to determine one or more financial accounts of one or more financial institutions associated with the extracted customer financial account data.

Based on the financial accounts, the kiosk receives information associated one or more financial products or product offerings associated with the one or more financial accounts. For example, the kiosk may access a database containing financial product data supplied by the financial institutions. The kiosk may select the supplied products or offerings that are associated with the identified financial institutions of the customer. Subsequently, the kiosk presents to the user each of the one or more financial institutions, and for each of the financial institutions, presents to the user the financial institution's respective financial accounts of the customer and the financial product offerings.

The customer may then select from the presented items one or more of the financial accounts and the financial products or offerings. The kiosk receives the selection, which may be input via a keyboard, a touch screen, or other input device. The kiosk then transmits to a service specialist computing device the user selection.

The customer may then speak with a customer service representative about the selected accounts and/or products. As such, the embodiments described herein provide for an improved customer experience with increased efficiency because the customer is enabled to discuss all of his or her financial accounts and/or needs with a customer service representative at a single location. Accordingly, the embodiments described herein allow a customer to forgo visiting each of his or her financial institutions and talking with several different service representatives, each of which does not have an entire picture of the customer's financial accounts and various financial products.

The methods and systems described herein may be implemented using computer programming or engineering techniques including computer software, firmware, hardware, or any combination or subset therefor. At least one of the technical problems addressed by this system includes the problem of enabling a customer service representative (e.g., a single point of contact) to have real-time, up-to-date financial information for a plurality of financial accounts and/or products that span a plurality of financial institutions. Typically, financial institutions only have access to financial accounts that they hold or have created for the customer. Another technical problem addressed by this system includes that of a financial institution being unaware of the multiple financial accounts or products owned by a customer, and thereby offering duplicative services and/or services not needed by a customer.

A technical effect of the systems and methods described herein is achieved by performing at least one of the following operations: (i) reading a machine-readable code in which customer financial account data associated with one or more financial accounts is encoded; (ii) decoding the machine-readable code to extract the customer financial account data of one or more financial institutions; (iii) receiving information associated one or more financial products associated with the one or more financial institutions; (iv) presenting to the user each of the one or more financial institutions; (v) for each of the one or more financial institutions, presenting to the user the respective one or more financial accounts corresponding to the customer financial account data and the respective one or more financial products; (vi) receiving from the user a selection of one or more of the financial accounts and the financial products; and (vii) transmitting to a service specialist computing device the user selection. The resulting technical effect achieved by the systems and methods described herein is at least one of: (i) aggregating a plurality of a customer's financial accounts and account data associated with one or more financial institutions; and (ii) reducing the risk of inaccurate offering or creating duplicative financial accounts or financial products for the customer.

As will be appreciated, based upon the description herein, the technical improvement in aggregating and presenting a plurality of financial accounts and real-time data associated therewith, across a plurality of financial institutions, as described is a computer-based solution to a technical deficiency or problem that is itself rooted in computer technology (i.e., the problem itself derives from the use of computer technology). More specifically, the technical problems and inefficiencies created accessing financial account data associated with only a single financial institution are the result of an implementation and use of computers in financial institution processing systems and methods intended to keep the financial account data local and secured. The present disclosure improves upon the conventional methods and systems in the manners described herein. Thus, the inefficiencies or technical problems created by the financial institution data processing systems and methods as described herein are solved by the methods and systems described and particularly claimed.

Financial Network System

FIG. 1 is a simplified block diagram of an exemplary streamline bank financial network system 100 including a customer mobile device 102 belonging to a customer 104, in accordance with one embodiment of the present disclosure. The financial network system 100 enables customers, such as the customer 104, to aggregate a variety of the customer's financial accounts, provided by one or more financial institutions 106, 108, and 110, and have the financial accounts centrally serviced or managed at a single financial service location 114 (also referred to as a "streamline bank"). The customer's financial accounts may include, for example, and without limitation, bank accounts, brokerage accounts, credit card accounts, reward program accounts, and any other financial accounts associated with the customer. Secure access to the customer's financial accounts and/or services may be accomplished using a single user credential, as is described further herein.

The streamline bank 114 includes a customer kiosk 116 that is configured to communicate with the customer mobile device 102 to exchange information related to the customer's financial accounts. The kiosk 116 is also configured to communicate with a customer service computing system 118 to transmit information related to the customer's financial accounts, thereby enabling the customer service representative 112 to assist the customer 104 with his or her selected accounts.

In the example embodiment, the financial network system 100 generally includes the customer mobile device 102, the financial institutions 106, 108, and 110, the streamline bank 114 (including the customer kiosk 116), the customer service computing system 118, and the interchange network 120 coupled in communication via a communications network 122. The network 122 includes, for example and without limitation, one or more of a local area network (LAN), a wide area network (WAN) (e.g., the Internet, etc.), a mobile network, a virtual network, and/or any other suitable public and/or private network capable of facilitating communication among the customer mobile device 102, the financial institutions 106, 108, and 110, the customer kiosk 116, the customer service computing system 118, and/or the interchange network 120. In some embodiments, the network 122 may include more than one type of network, such as a private payment transaction network provided by the interchange network 120 to the financial institutions 106, 108, and 110, and the streamline bank 114 and, separately, the public Internet, which may facilitate communication between the customer mobile device 102, the interchange network 120, and the financial institutions 106, 108, and 110, etc.

Embodiments described herein may relate to a transaction card system, such as a credit card payment system using the Mastercard® interchange network. (Mastercard is a registered trademark of Mastercard International Incorporated.) The Mastercard interchange network is a set of proprietary communications standards promulgated by Mastercard International Incorporated for the exchange of financial transaction data and the settlement of funds between financial institutions that are members of Mastercard International Incorporated.

With continued reference to FIG. 1, in the exemplary embodiment, the customer mobile device 102 (e.g., a smartphone or other computing device used by the customer 104) includes a variety of financial applications installed thereon. In the exemplary embodiment, the financial applications include a financial application 106A associated with the financial institution 106, a financial application 108A associated with the financial institution 108, a financial application 110A associated with the financial institution 110, and a financial application 114A (or Streamline Bank App)

associated with the streamline bank 114. It is contemplated that fewer or more financial applications may be installed on the customer mobile device 102, where each application is associated with at least one financial institution.

The customer mobile device 102 may communicate with the customer kiosk 116 and the network 122. The financial applications 106A, 108A, and 110A may access the network 122 to exchange financial data between the financial institutions 106, 108, and 100, respectively. In addition, the financial application 114A may communicate with the financial applications 106A, 108A, and 110A to access the financial data and communicate with the customer kiosk 116 transmit and/or receive the financial data therebetween.

The customer mobile device 102 can be any computing device capable of interconnecting to the network 122, such as the Internet, including a mobile web-based device, smartphone, PDA, or other mobile web-based connectable equipment. The customer mobile device 102 is interconnected to the Internet through one or more interfaces including a network, such as a local area network (LAN) or a wide area network (WAN), dial-in-connections, cable modems, wireless modems, and special high-speed ISDN lines. In addition, in the example embodiment, the customer mobile device 102 is configured to communicate with the customer kiosk 116 using various forms of communication including, for example, radio frequency communication, near field communication (NFC), network-based communication, a wired link, and the like.

As shown in FIG. 1, the streamline bank 114 includes the customer service computing system 118, which is, for example, and without limitation, a computer, a server, a network of multiple computing devices, a virtual computing device, or the like. In addition, in some embodiments, the financial network system 100 may also include one or more banking sub-systems 126, 128, and 130 (also referred to as bank systems) coupled in communication to the network 122. The bank systems 126, 128, and 130 are computers including, for example, a web application and a memory device, such that the bank systems 126, 128, and 130 are in communication with the customer service computing system 118 using, for example, the Internet. The bank systems 126, 128, and 130 are interconnected to the Internet through one or more interfaces including a network, such as a local area network (LAN) or a wide area network (WAN), dial-in-connections, cable modems, and special high-speed ISDN lines. The bank systems 126, 128, and 130 can be any computing device capable of interconnecting to the Internet including, for example, a web-based smartphone, a personal digital assistant (PDA), or any other web-based connectable equipment.

The customer service computing system 118 may include, for example, a database server 132, which may be connected to a database 134. In one embodiment, the database 134 is stored on the customer service computing system 118 and can be accessed by a customer service representative 112 by logging onto the customer service computing system 118. In an alternative embodiment, the database 134 may be stored remotely from the customer service computing system 118 and may be non-centralized.

The database 134 is configured to receive and store information related to various financial products being offered by a variety of financial institutions, such as the financial institutions 106, 108, and 110. While three (3) financial institutions are illustrated in FIG. 1, it is noted that any number and variety of financial institutions can be in communication with the database 134, for example, via the network 122. For example, in one embodiment, the financial institutions may include, without limitation, banks, treasuries, stock agencies, corporate entities, and the like. Each financial institution may supply data related to its current financial product offerings. The supplied data can be different for different types of financial products, instruments, offerings, and the like. For example, treasuries data may include a description of the treasury, its price, volume, and/or any other data associated with government securities, bonds, warrants, etc. Stock investment data may include information related to stock, options, or other investment instruments that can be traded, sold, swapped, and/or exchanged. Bank product data may include information related to deposit accounts, savings accounts, CDs, loans, etc. including information such as interest rates, terms, costs, fess, and the like.

In the exemplary embodiment, the customer mobile device 102 is used to present a machine-readable code 135 on a display of the customer mobile device 102. The customer mobile device 102 is positioned within a predetermined distance of the customer kiosk 116. As used herein, the phrase "predetermined distance" includes a relative distance between two devices that enables communication as defined by the communication technology, for example, radio frequency communication, near field communication (NFC), optical scanners, and the like. The customer kiosk 116 scans the machine-readable code 135 and extracts information therefrom, such as communication information and/or financial account data. The customer mobile device 102 is detected by and communicates with the customer kiosk 116. The customer kiosk 116 may be positioned in various locations at the streamline bank 114 that are determined to be desirable for interfacing with the customer 104 and his or her customer mobile device 102, including, for example, and without limitation, proximate an entry door or dispersed in a lobby of the streamline bank 114.

In one suitable embodiment, when positioned within the predetermined distance, the customer kiosk 116 sends an initial signal wirelessly to a transceiver (not shown in FIG. 1) of the customer mobile device 102. The initial signal is processed by the customer mobile device 102 and a response signal is sent back to the customer kiosk 116. The response signal is processed by customer kiosk 116 and a wireless connection 136 is thereby established.

In another embodiment, the customer mobile device 102 sends the initial signal to a transceiver (not shown in FIG. 1) of the customer kiosk 116 wirelessly. The initial signal is processed by the customer kiosk 116 and a response signal is sent to the customer mobile device 102 wirelessly. The response signal is processed by the customer mobile device 102 and the wireless connection 136 is established.

In one embodiment, the initial signal sent from the customer mobile device 102 to the customer kiosk 116 includes a customer mobile device identifier (ID) 138. In addition, a customer kiosk ID 140 is transmitted to the customer mobile device 102 when the wireless connection 136 is established. The IDs 138 and 140 are used by the customer mobile device 102 and the customer kiosk 116 to verify that information being transmitted by one or the other of the devices is being transmitted to the correct device, as is described further herein.

In one example embodiment, the customer service computing system 118 is configured to receive digital wallet data 226 (shown in FIG. 2) from the customer mobile device 102 over a network connection to the network 122. As described herein, when a user (e.g. the customer 104) performs a transaction, digital wallet data 226 is generated. The digital wallet data 226 is transmitted across computer devices as a digital wallet data message. In one embodiment, when the user performs a payment transaction via the customer mobile device 102, the digital wallet data 226 for the transaction is transmitted to the customer service computing system 118 and subsequently to the interchange network 120. The interchange network 120 processes the digital wallet data 226 to complete the payment transaction between the user (via the digital wallet data 226) and the streamline bank 114 (via the customer service computing system 118).

The digital wallet data message may include a transaction amount, a transaction date, account data related to the transaction card used to perform the transaction (e.g., primary account number associated with transaction card, card expiration date, card issuer, card security code, or the like), a merchant identifier, stock-keeping unit (SKU) data relating to the goods or services purchased from the merchant, or the like. In one embodiment, the digital wallet data message also includes location data. As used herein, location data may include address data, city data, state data, zip or postal code data, country data, merchant location identifier data, IP address data, MAC address data, and/or the like. In another embodiment, the digital wallet data message further includes demographic data. This demographic data may correspond to the user's age, place of origin, gender, and the like.

The embodiments illustrated and described herein as well as embodiments not specifically described herein but within the scope of aspects of the invention constitute exemplary means for servicing a consumer's multiple financial accounts held by various financial institutions at a single financial service location, e.g. the streamline bank 114, and more particularly, constitute exemplary means for selecting certain ones of the consumer's multiple financial accounts using a service computing device, e.g. the customer kiosk 116. For example, the customer mobile device 102, the customer kiosk 116, the customer service computing system 118, the bank systems 126, 128, and 130, or any other similar computer device(s), specially programmed with computer-executable instructions to execute processes and techniques with a processor as described herein, constitutes exemplary means for enabling a user to conduct, manage, track, open, and have serviced financial accounts of the user across various financial institutions using the streamline bank 114.

The financial network system 100 described herein is further configured to approve "cardless" electronic transactions made using a PAN having the customer mobile device 102 "registered" thereto using, for example, wireless communication, unique user account data, and/or the location (e.g., GPS coordinates) of the computing devices (e.g., the customer mobile device 102 and the customer service computing system 118). The electronic transaction is cardless in that the user (e.g., the customer 104) does not have to physically handle the transaction card during the electronic transaction. For example, the customer 104 receives a transaction card from his or her issuer (not shown) and enters registration information into the customer mobile device 102 to register with a payment processing system that enables the customer mobile device 102 to electronically initiate cardless electronic transactions. Registration information includes, for example, and without limitation, transaction card information, contact information (e.g., an email address and/or a telephone number), billing information, and/or shipping information. Transaction card information may include, for example, a transaction card or payment account identifier (e.g., a PAN, a partial account number, and/or a card name), a security code, and/or an expiry date. Shipping information may include, for example, a delivery address and/or delivery instruction. In one embodiment, the customer 104 enters, among other data inputs, a PAN into the customer mobile device 102. The PAN is stored in the memory device 304 (shown in FIG. 3). In another embodiment, the PAN is entered into the customer mobile device 102 but is then sent on to a payment processor (e.g., the interchange network 120) where it is tokenized, and the token PAN is returned to the customer mobile device 102 for storage.

Additionally, the customer 104 may provide a biometric sample that is stored in the customer mobile device 102. The biometric sample is to be associated with the registration information provided by the customer 104 and is used as the single user credential, discussed above. Biometric samples include, without limitation, a fingerprint image, a voice recording, a retinal image, facial recognition, palm print image, iris recognition, and the like. The biometric sample is unique to the customer 104 and is difficult to duplicate and/or forge by an unauthorized user. The biometric sample is stored and associated with a biometric identifier. Additionally, the biometric identifier is associated with the stored registration information and facilitates secure authorization of transactions initiated using any of the registration information. A biometric input device in communication with the customer mobile device 102 may be used for the customer to enter the biometric sample. For example, the customer mobile device 102 may include an integral fingerprint or palm reader/scanner, retinal or iris reader/scanner, camera, and/or voice reader/recorder.

Exemplary Computer Systems

Figure 2:
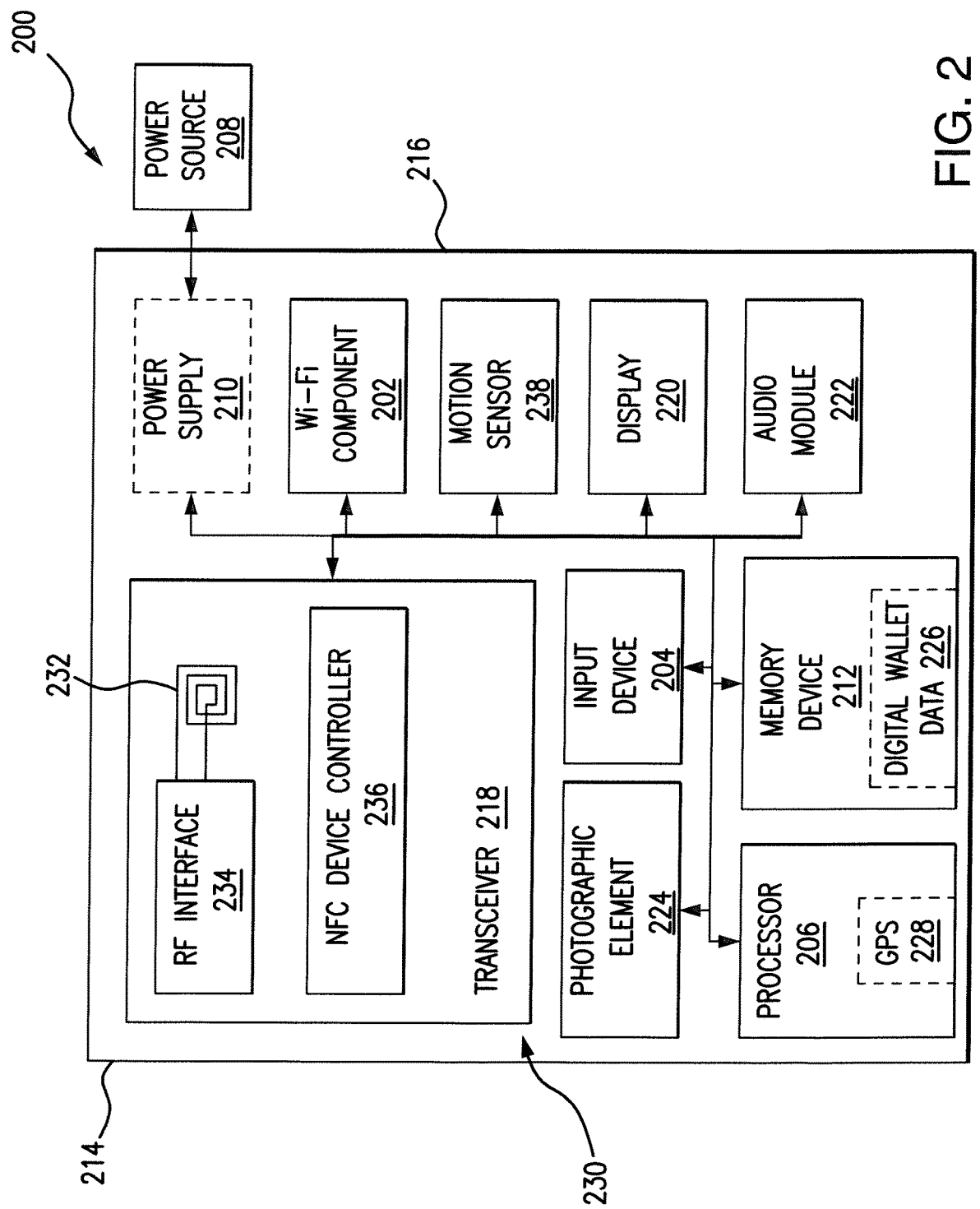
FIG. 2 is an example configuration of a user computing system that may be used by a user, such as the customer shown in FIG. 1.

FIG. 2 is an example configuration of a user computing system 200 that may be used by a user, such as the customer 104 (shown in FIG. 1). In some embodiments, the computing system 200 is a customer mobile device 102 (shown in FIG. 1) and/or a customer kiosk 116 (shown in FIG. 1). In the example embodiment, the computing system 200 is a computing device configured to connect to one or more of the customer mobile device 102, the customer kiosk 116, the customer service computing system 118, the network 122, the bank systems 126, 128, and 130, and other computing devices, such as other customer mobile computing devices (not shown).

In the exemplary embodiment, the computing system 200 generally includes a processor 206, a memory device 212, a transceiver 218 (or a wireless communication device), and a photographic element 224. In addition, the computing system 200 includes an integrated Wi-Fi component 202 (e.g., implementing the Institute of Electrical and Electronics/IEEE 802.11 family of standards), an input device 204, a display 220, and an audio module 222. Optionally, the computing system 200 may include a motion sensor 238. The computing system 200 may include an external power source 208 to receive power, or alternatively, in some embodiments, the computing system 200 may include an internal power supply 210 (e.g., a battery or other self-contained power source).

The processor 206 includes one or more processing units (e.g., in a multi-core configuration) specially programmed for executing computer readable instructions. The instructions may be executed within a variety of different operating systems (OS) on the customer mobile device 102, such as UNIX, LINUX, Microsoft Windows®, etc. More specifically, the instructions may cause various data manipulations on data stored in the memory device 212 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.). The memory device 212 is any device allowing information such as the digital wallet data 226 (optional), the executable instructions, and/or written works to be stored and retrieved. The memory device 212 includes one or more computer readable media.

In the example embodiment, the processor 206 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 200 may be widely deployed, it may be impractical to manually update software for each computing system 200. Therefore, the system 100 provides a mechanism for automatically updating the software on the computing system 200. For example, an updating mechanism may be used to automatically update any number of components and their drivers, both network and non-network components, including system level (OS) software components. In some embodiments, the computing system 200 components are dynamically loadable and unloadable; thus, they may be replaced in operation without having to reboot the OS.

A location of the computing system 200 can be obtained through conventional methods, such as a location service (e.g., global positioning system (GPS) service) in the computing system 200, "ping" data that includes geotemporal data, from cell location register information held by a telecommunications provider to which the computing system 200 is connected, and the like. For example, in one suitable embodiment, an optional GPS chip 228 can be part of or separate from the processor 206 to enable the location of the computing system 200 to be determined.

Stored in the memory device 212 are, for example, computer readable instructions for providing a user interface to the user via the display 220 and, optionally, receiving and processing input from the input device 204. A user interface may include, among other possibilities, a web browser and one or more of the financial applications 106A, 108A, 110A, and/or 114A (shown in FIG. 1). Web browsers enable users, such as the customer 104, to display and interact with media and other information typically embedded on a web page or a website. The financial applications 106A, 108A, 110A, and/or 114A allow the customer 104 to interact with the customer kiosk 116 and the bank system 126, 128, and/or 130 to send and receive financial information related to the customer's financial accounts.

The photographic element 224 may include a camera or other optical sensor and lens combination capable of generating a live video visual feed and taking a picture or capturing an image. In various embodiments, the photographic element 224 may be integrated in a housing or body, such as a housing 214, of the computing system 200. When the photographic element 224 captures an image or otherwise generates image data (e.g., video data), the photographic element 224 may store the image data in a data file, either in a raw or compressed format, in the memory device 212.

In some embodiments, the motion sensor 238 may include one or more sensor elements that detect a person's presence. For example, if the computing system 200 is operating as the customer kiosk 116, the motion sensor 238 detects when the customer 104 approaches the customer kiosk 116. Upon detection of the presence of a person, the photographic element 224 may begin capturing images (e.g., still or video images), the transceiver 218 may be activated, and/or the audio module 222 may begin capturing audio. The motion sensor 238 may be operatively coupled to the photographic element 224 such that the person's presence may be detected by detecting motion using the photographic element 224. The motion sensor 238 may include, for example, and without limitation, sensor elements such as a passive infrared sensor, an ambient light sensor, and the like.

In the example embodiment, the display 220 can include, for example, and without limitation, a liquid crystal display (LCD), an organic light emitting diode (OLED) display, or an "electronic ink" display. In some embodiments, a single component such as a touch screen may function as both an output device (e.g., the display 220) and the input device 204. As such, the display 220 may optionally include a touch controller for support of touch capability. In such embodiments, the computing system 200 may detect a person's presence by detecting that the person has touched the display 220 of the computing system 200.

The audio module 222 may include, for example, and without limitation, a speaker and related components capable of broadcasting streaming and/or recorded audio and may also include a microphone. The microphone facilitates capturing audio through the computing system 200.

In the example embodiment, the computing system 200 includes the housing 214 at least partly (and more preferably, at least substantially or entirely) enclosing the components described above. In addition, the computing system 200 includes circuitry 230 configured to communicate with the customer mobile device 102 (shown in FIG. 1). The circuitry 230 may include, for example, leads, connectors, NFC-enabled circuitry, Wi-Fi-enabled circuitry, and photographic element circuitry. The housing 214 is preferably configured to seal the circuitry 230, which is susceptible to degradation from the ambient environment. In one embodiment, the circuitry 230 is hermetically sealed in the housing 214. For example, in one embodiment, the circuitry 230 is completely and permanently encased within the housing 214. In other words, the housing 214 and the circuitry 230 are intended to remain as a single, inseparable unit throughout the life of the computing system 200. It is understood that the housing 214 can be formed separately from the circuitry 230 and that the circuitry 230 can be placed into and sealed within the housing 214 in a separate operation. It is also understood that the housing 214 can be oversized with respect to the circuitry 230 so that the circuitry 230 can be placed loosely into the housing 214. In another embodiment, the circuitry 230 can be selectively, sealingly enclosed within the housing 214, where the housing 214 includes a closure 216 removably attached to a body of the housing 214.

The housing 214 is fabricated from a suitably selected material that facilitates inhibiting the effect the material has on the signal being emitted from, for example, the transceiver 218 and/or the Wi-Fi component 202 and passing through the housing material. For example, and without limitation, suitable materials from which the housing 214 may be fabricated include polyethylene, propylene, isoprene, and butylenes (i.e., polyolefins). In other embodiments, the housing 214 is fabricated from any material that enables the computing system 200 to function as described herein.

In one embodiment, the transceiver 218 includes an antenna 232. The antenna 232 includes a looped wire configured to transmit radio signals when current flows through the looped wire. The antenna 232 is any size, shape, and configuration that is suitable for transmitting signals as described herein. For example, the antenna 232 is a tuned circuit configured to transmit radio signals in any radio-based communication system including, but not limited to, Radio Frequency Identification (RFID), Wireless Local Area Network (WLAN), and Wireless Personal Area Network (WPAN) systems. In the example embodiment, the antenna 232 generates a magnetic field when it vibrates at a selected frequency. Specifically, the antenna 232 is configured to vibrate at a frequency of about 13.56 MHz, which is suitable for use in a near field communication (NFC) system.

In the example embodiment, the antenna 232 transmits radio signals to and receives radio signals from other NFC-enabled computing devices, for example, the customer mobile device 102 (shown in FIG. 1) or any other components used in NFC systems. In NFC systems, at least one NFC component generates a magnetic field to inductively transfer currents and, thereby, exchange signals and information with other NFC components positioned within the magnetic field. In the exemplary embodiment, the antenna 232 functions as an NFC component to send and receive signals. The antenna 232 is configured to transmit radio signals to NFC components positioned within the magnetic field of the antenna 232, such as when the customer mobile device 102 is located within a predetermined distance of the customer kiosk 116. Therefore, the magnetic field generated by the antenna 232 defines the active range of the computing system 200. Additionally, the antenna 232 receives radio signals from NFC components when the antenna 232 is positioned within the magnetic field of the NFC components.

The transceiver 218 also includes a radio frequency (RF) interface 234 and an NFC device controller 236. The RF interface 234 and the NFC device controller 236 are powered by the power source 208, and in some embodiments, the internal power supply 210 and/or the display device 220. In addition, the processor 206 and the memory device 212 are powered in the same manner. The RF interface 234 is configured to receive and transmit RF signals through the antenna 232. The NFC device controller 236 is configured to process the received RF signals and to generate signals to be transmitted by the RF interface 234. The memory device 212 is configured to store data associated with transmitting and receiving the RF signals. The NFC device controller 236 is coupled in communication with the processor 206.

In some embodiments, the computing system 200 may be connected to one or more peripheral devices (not shown). That is, the computing system 200 may communicate various data with one or more peripheral devices. For example, the computing system 200 may communicate with one or more peripheral devices through the Wi-Fi component 202, the transceiver 218, or other suitable means.

Figure 3:
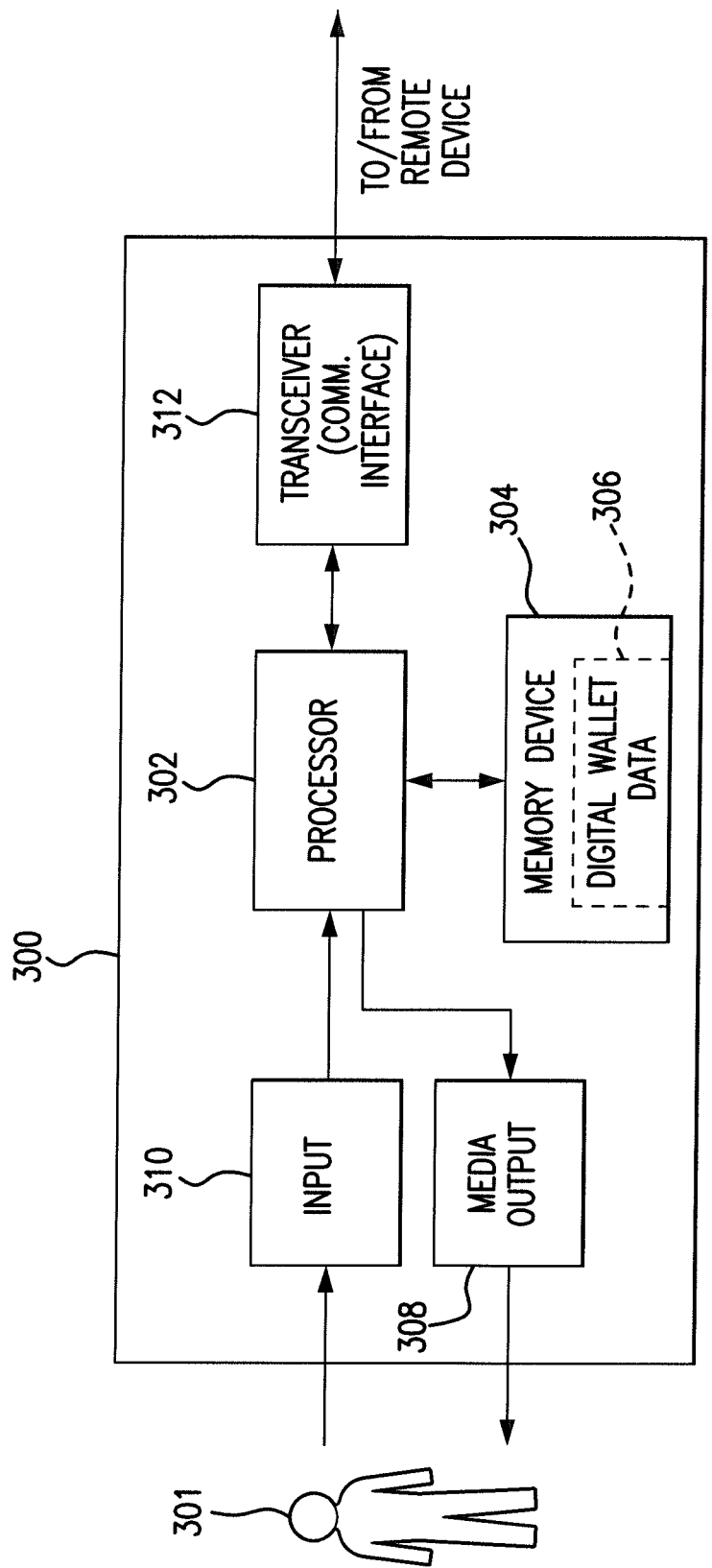
FIG. 3 is an example configuration of a user system operated by a user, such as the customer service representative shown in FIG. 1.

FIG. 3 is an example configuration of a user system 300 operated by a user 301, such as the customer service representative 112 (shown in FIG. 1). In some embodiments, the user system 300 is a customer service computing system 118 (shown in FIG. 1), and/or a bank system 126, 128, and/or 130 (shown in FIG. 1).

In the example embodiment, the user system 300 includes one or more processors 302 for executing instructions. In some embodiments, executable instructions are stored in a memory device 304. The processor 302 may include one or more processing units arranged, for example, in a multi-core configuration. The memory device 304 is any device allowing information such as executable instructions, data, and/or written works to be stored and retrieved. The memory device 304 includes one or more computer readable media.

The user system 300 also includes at least one media output component 308 for presenting information to the user 301. The media output component 308 is any component capable of conveying information to the user 301. In some embodiments, the media output component 308 includes an output adapter such as a video adapter and/or an audio adapter. An output adapter is operatively coupled to the processor 302 and operatively connectable to an output device such as a display device, a liquid crystal display (LCD), organic light emitting diode (OLED) display, or "electronic ink" display, or an audio output device, a speaker, or headphones.

In some embodiments, the user system 300 includes an input device 310 for receiving input from the user 301. The input device 310 may include, for example, a touch sensitive panel, a touch pad, a touch screen, a stylus, a photographic element or camera, an optical sensor, a gyroscope, an accelerometer, a position detector, a keyboard, a pointing device, a mouse, or an audio input device. A single component such as a touch screen may function as both an output device of the media output component 308 and the input device 310. The user system 300 may also include a transceiver 312 (broadly, a communication interface), which is communicatively connectable to a remote device such as the customer mobile device 102 and/or customer kiosk 116 (each shown in FIG. 1). The transceiver 312 may include, for example, a wired or wireless network adapter or a wireless data transceiver for use with radio frequency communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 304 are, for example, computer readable instructions for providing a user interface to the user 301 via the media output component 308 and, optionally, receiving and processing input from the input device 310. A user interface may include, among other possibilities, a web browser and various software applications. Web browsers enable users, such as the customer service representative 112, to display and interact with media and other information typically embedded on a web page or a web site. The software application allow the customer service representative 112 to interact with the customer mobile device 102, the customer kiosk 116, the bank systems 126, 128, and/or 130, and the interchange network 120 to facilitate providing various financial services to the customer 104 and, optionally, execute a transaction upon delivery of such services.

Figure 4:
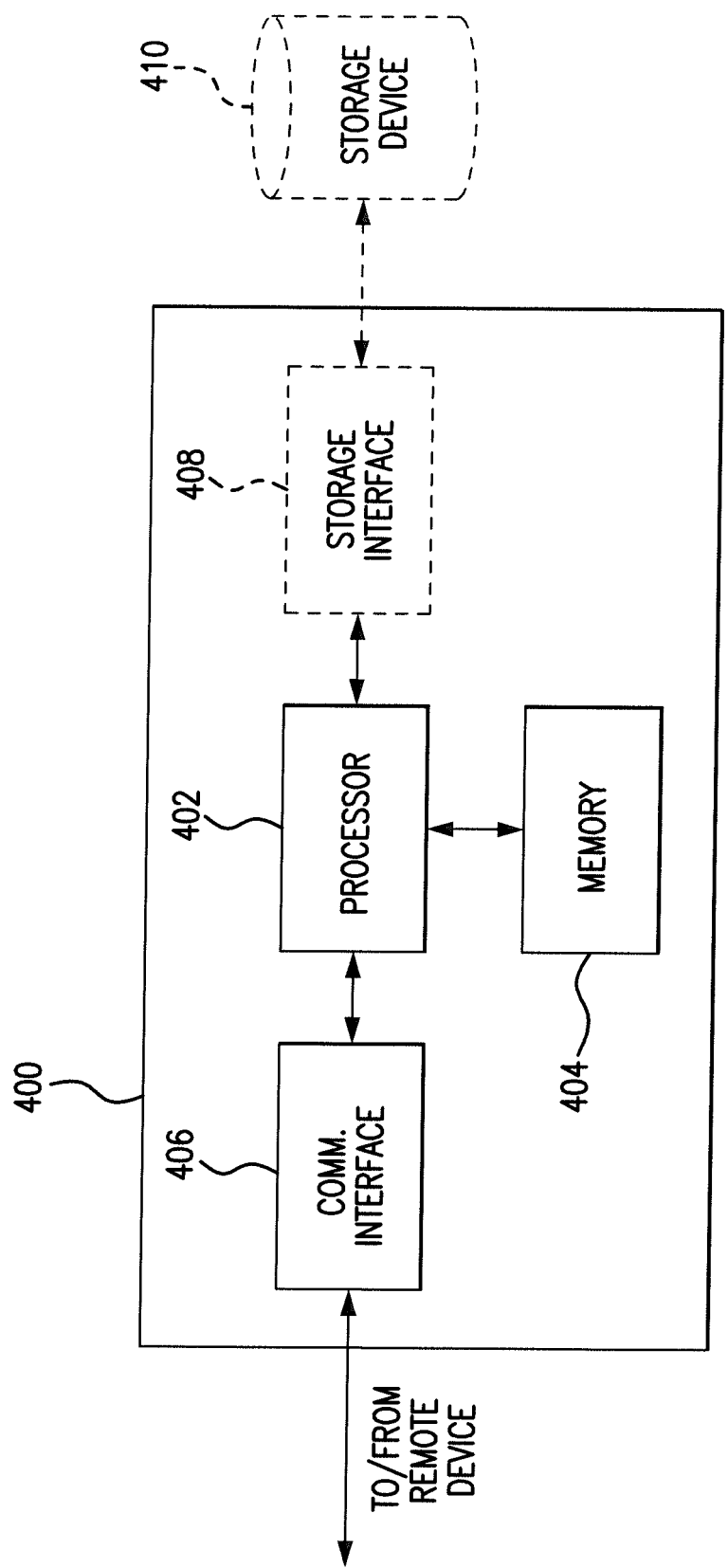
FIG. 4 is an example configuration of a server system for use in the streamline bank financial network system shown in FIG. 1.

FIG. 4 is an example configuration of a server system 400, such as the database server 132 (shown in FIG. 1). In the example embodiment, the server system 400 includes a processor 402 for executing instructions. The instructions may be stored in a memory area 404, for example. The processor 402 includes one or more processing units (e.g., in a multi-core configuration) for executing the instructions.

The instructions may be executed within a variety of different operating systems on the server system 400, such as UNIX, LINUX, Microsoft Windows®, etc. More specifically, the instructions may cause various data manipulations on data stored in a storage device 410 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

The processor 402 is operatively coupled to a communication interface 406 such that the server system 400 can communicate with a remote device such as a user system 300 or another server system 400. For example, the communication interface 406 may receive communications from the customer service computing system 118.

The processor 402 is operatively coupled to the storage device 410. The storage device 410 is any computer-operated hardware suitable for storing and/or retrieving data. In some embodiments, the storage device 410 is integrated in the server system 400. In other embodiments, the storage device 410 is external to the server system 400 and is like the database 134 (shown in FIG. 1). For example, the server system 400 may include one or more hard disk drives as the storage device 410. In other embodiments, the storage device 410 is external to the server system 400 and may be accessed by a plurality of server systems 400. For example, the storage device 410 may include multiple storage units such as hard disks or solid-state disks in a redundant array of inexpensive disks (RAID) configuration. The storage device 410 may include a storage area network (SAN) and/or a network attached storage (NAS) system.

In some embodiments, the processor 402 is operatively coupled to the storage device 410 via a storage interface 408. The storage interface 408 is any component capable of providing the processor 402 with access to the storage device 410. The storage interface 408 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 402 with access to the storage device 410.

The memory area 404 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

In some embodiments, it is contemplated that the server system 400 is implemented as a software application. In such embodiments, the hardware described above, such as the processor 402, the memory area 404, the communication interface 406, and/or the storage interface 408 may be shared with the hardware components of a user system 300, such as the processor 302, the memory device 304, and/or the transceiver 312.

User Interface Examples

Figure 5:
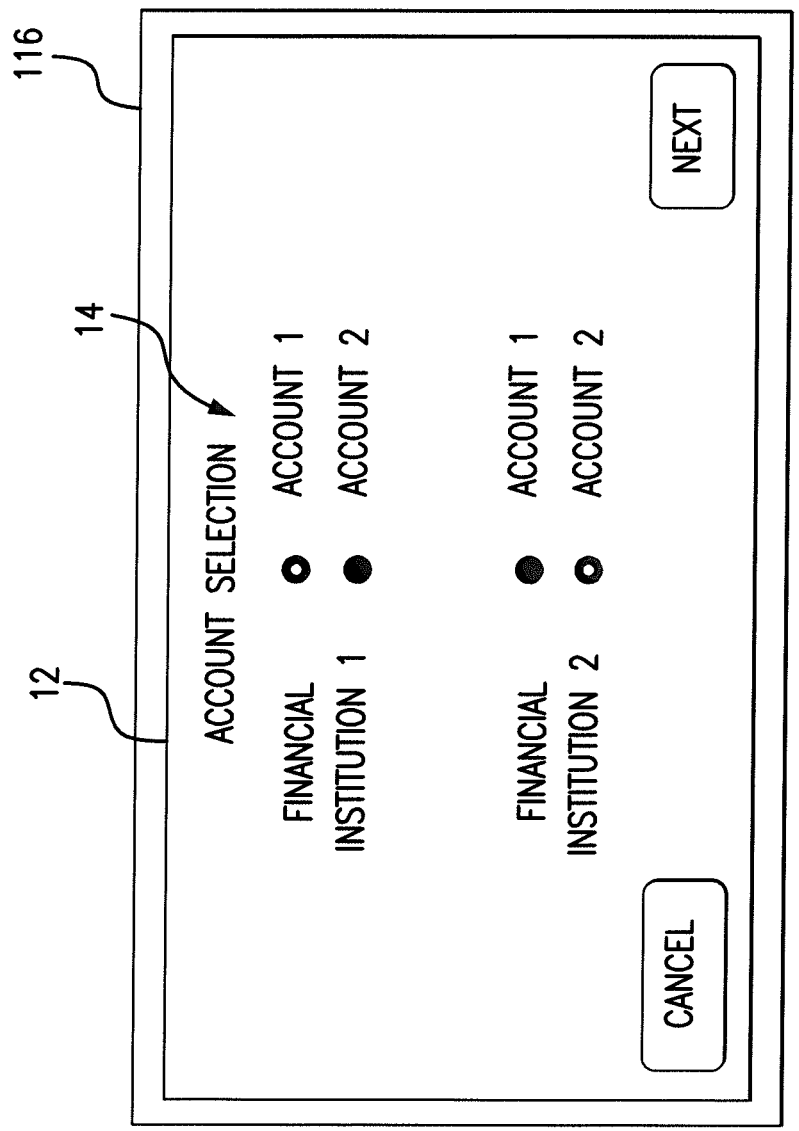
FIG. 5 a schematic diagram illustrating an exemplary user interface that may be presented to a user, such as the customer shown in FIG. 1, by the customer kiosk on a display of the kiosk.

Reference is now made to FIG. 5, which is a schematic diagram illustrating an exemplary user interface 12 that may be presented to a user (e.g., the customer 104 shown in FIG. 1) by the customer kiosk 116 on a display of the kiosk (such as the display 220 shown in FIG. 2). In the exemplary embodiment, an account selection screen 14 presents to the customer 104 a list of each of the customer's financial institutions (such as the financial institutions 106, 108, and 110 shown in FIG. 1) as determined from the customer's financial account data, as described herein. In addition, the account selection screen 14 presents to the customer 104 each of the customer's financial accounts associated with the respective, displayed financial institution along with an option to select one or more of the presented financial accounts. In particular, the account selection screen 14 includes a selectable icon (e.g., a radio button and the like) adjacent each account label. A "NEXT" icon and a "CANCEL" icon is presented to the customer 104 for selection, as is typical for user interface interactions. As shown in FIG. 2, the customer 104 has selected the radio button adjacent Account 1 of Financial Institution 1 and Account 2 of Financial Institution 2. After the customer 104 has selected the financial accounts, the customer 104 selects the "NEXT" icon presented on the user interface 12 to continue, or the "CANCEL" icon to cancel the operation.

Figure 6:
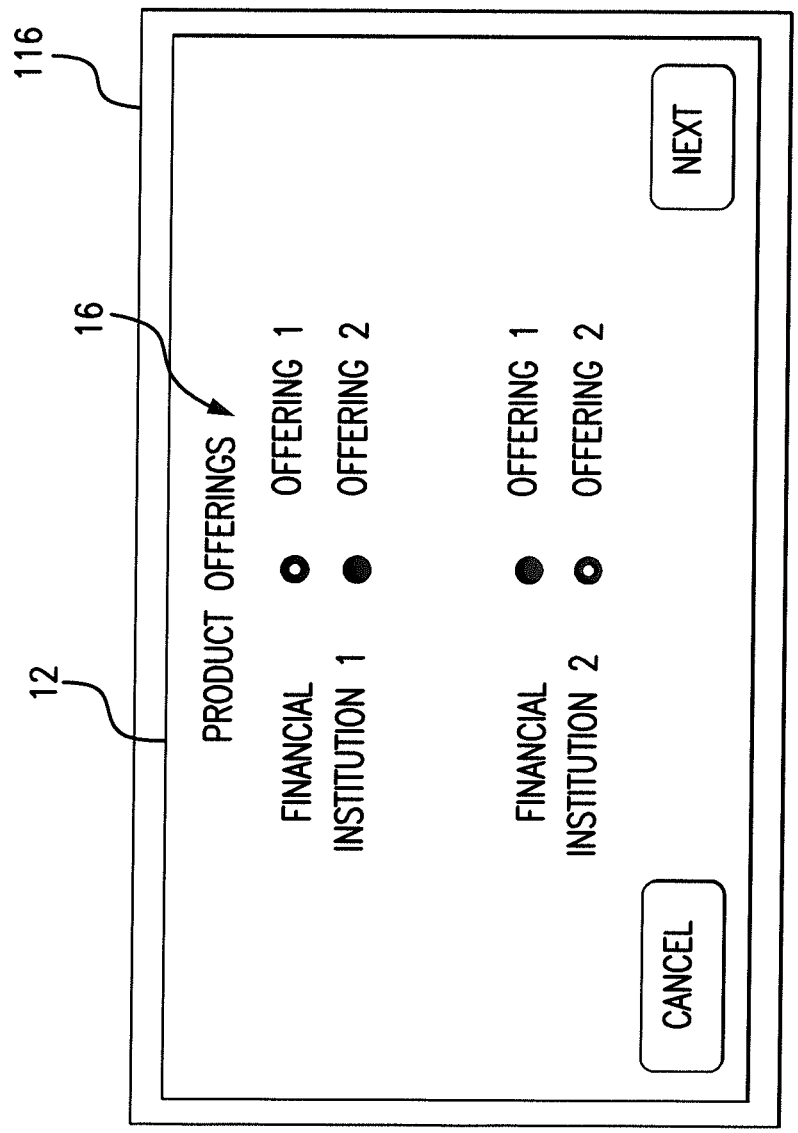
FIG. 6 is a schematic diagram of the user interface of the customer kiosk, illustrating a financial product offerings screen presented to the customer shown in FIG. 1.

FIG. 6 is a schematic diagram of the user interface 12 of the customer kiosk 116, illustrating a financial product offerings screen 16 presented to the customer 104 (shown in FIG. 1). In the exemplary embodiment, the financial product offerings screen 16 presents an option to select one or more of the presented financial product offerings associated with each of the customer's financial institutions. The product offerings can include any one or more of the financial accounts that the financial institution offers. For example, and without limitation, if the customer 104 has a checking account at Financial Institution 1 but not a savings account, the financial product offerings screen 16 may present the option for the customer to select a savings accounts associated with Financial Institution 1.

The financial product offerings screen 16 includes a selectable icon (e.g., a radio button and the like) adjacent each financial product offering label. A "NEXT" icon and a "CANCEL" icon is presented to the customer 104 for selection. As shown in FIG. 6, the customer 104 has selected the radio button adjacent Offering 1 of Financial Institution 1 and Offering 2 of Financial Institution 2. After the customer 104 has selected the financial product offerings, the customer 104 selects the "NEXT" icon presented on the user interface 12 to continue, or the "CANCEL" icon to cancel the operation.

Figure 7:
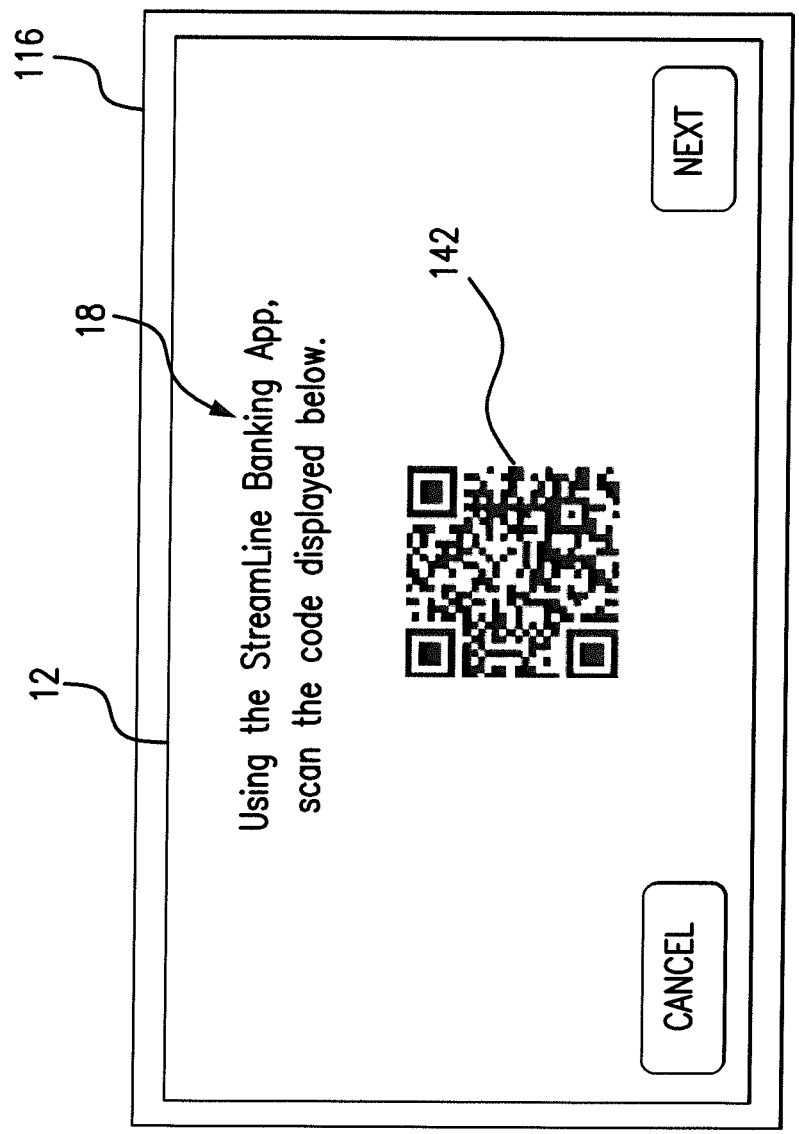
FIG. 7 is a schematic diagram of the user interface of the customer kiosk, illustrating a machine-readable code screen presented to the customer shown in FIG. 1.

FIG. 7 is a schematic diagram of the user interface 12 of the customer kiosk 116, illustrating a machine-readable code screen 18 presented to the customer 104 (shown in FIG. 1). In the exemplary embodiment, the machine-readable code screen 18 presents a machine-readable transaction code 142 for scanning by the customer 104 using the customer mobile device 102, and more particularly, using the Streamline Bank App 114A of the customer mobile device 102. An "END" icon and a "CANCEL" icon is presented to the customer 104 for selection. After the customer 104 has scanned the machine-readable transaction code 142, the customer 104 selects the "END" icon presented on the user interface 12 to continue. Alternatively, if the customer chooses to stop the operation without scanning the machine-readable transaction code 142, the customer 104 selects the "CANCEL" icon.

Exemplary Computer-Implemented Methods

Figure 8:
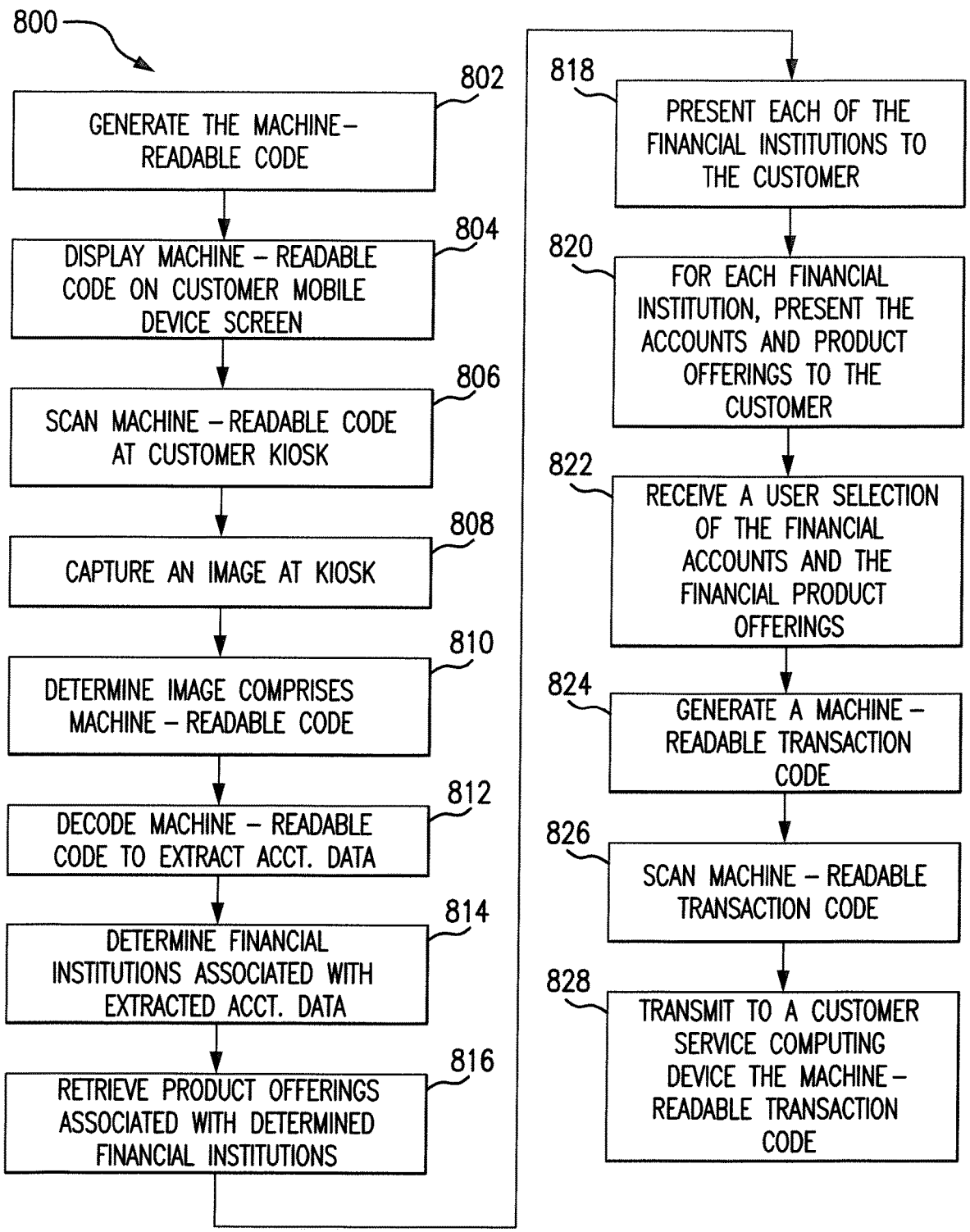
FIG. 8 is a flowchart illustrating an exemplary computer-implemented method for enabling a customer, such as the customer shown in FIG. 1, to select and receive service for one or more of the customer's financial accounts at a single location, such as the streamline bank shown in FIG. 1, in accordance with one embodiment of the present disclosure.

FIG. 8 is a flowchart illustrating an exemplary computer-implemented method 800 for enabling a customer, such as the customer 104 (shown in FIG. 1), to select and receive service for one or more of the customer's financial accounts at a single location, such as the streamline bank 114 (shown in FIG. 1), in accordance with one embodiment of the present disclosure. The operations described herein may be performed in the order shown in FIG. 8 or, according to certain inventive aspects, may be performed in a different order. Furthermore, some operations may be performed concurrently as opposed to sequentially. In addition, some operations may be optional.

The computer-implemented method 800 is described below, for ease of reference, as being executed by exemplary devices and components introduced with the embodiments illustrated in FIGS. 1-7. In one embodiment, the computer-implemented method 800 may be implemented by the streamline bank 114 using one or more computing devices, such as the customer kiosk 116 and the customer service computing system 118 (each shown in FIG. 1). In the exemplary embodiment, the computer-implemented method 800 relates to receiving aggregated information relating to one or more financial accounts belonging to a customer, including a selection from among the financial accounts for servicing. While operations within the computer-implemented method 800 are described below regarding the customer kiosk 116, the computer-implemented method 800 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

Initially, a customer, such as the customer 104, installs the financial application 114A (the Streamline Bank App) associated with the streamline bank 114 to his or her customer mobile device 102. The financial application 114A provides aggregated financial account capabilities. For example, when the customer 104 executes the financial application 114A, the customer may be asked to input or otherwise provide access to his or her financial applications, such as the financial applications 106A, 108A, and 110A (shown in FIG. 1), and/or financial accounts via webservices provided by his or her financial institutions, such as the financial institutions 106, 108, and 110. Secure access to the multiple financial applications and/or financial accounts may be achieved using a single user credential, such as a biometric sample, as described herein. Typically, the financial application 114A uses various application program interfaces (APIs) to access the customer's financial applications and/or accounts, and the related financial data.

After access to the customer's financial accounts is established, for example, by receiving and authenticating the single user credential, financial information may be gathered to facilitate providing aggregated financial services. The aggregated financial services include, for example, and without limitation, allowing the customer 104 and his or her customer service representative 112 to review account activities, balances, transactions, and other financial information associated with the customer's financial accounts. The customer 104 may select an account to discuss with the customer service representative that is specific to that account, and/or may select several accounts to simultaneously view and discuss information associated with the selected multiple financial accounts.

In the example embodiment, the customer 104 visits a streamline bank 114 to receive financial services directed to one or more of his or her financial accounts, and/or to add or open a new financial account. The customer 104 may select any number of his financial accounts and/or financial product offerings for servicing before proceeding to speak with a customer service representative, such as the customer service representative 112 (shown in FIG. 1).

The customer 104 approaches the customer kiosk 116 located at the streamline bank 114. At operation 802, the customer 104 instructs the financial application 114A to generate the machine-readable code 135 such as a barcode or quick response (QR) code, that includes, for example, the customer's financial accounts that were input to the financial application 114A and the respective financial account data associated therewith. At operation 804, the machine-readable code 135 is displayed on the customer mobile device 102, for example, via the display 220.

At operation 806, the customer 104 presents or scans the machine-readable code 135 at the customer kiosk 116. For example, and without limitation, the customer kiosk 116 may detect the presence of the customer 104, for example, by detecting the customer mobile device 102, and automatically activate the photographic element 224 to capture one or more images. In some embodiments, the customer 104 may interact with the customer kiosk 116 to initiate the scanning operation. For example, the customer kiosk 116 may detect the presence of the customer 104 and automatically activate the user interface 12 (shown in FIG. 5). The customer 104 may press a button or icon displayed on the user interface 12 to initiate the scanning function of the customer kiosk 116. The customer kiosk 116 receives the input from the customer 104 and activates the photographic element 224 to scan the display of the customer mobile device 102.

At operation 808, when the display 220 of the customer mobile device 102 is presented within the field of view of the photographic element 224, the customer kiosk 116 captures one or more images of the machine-readable code 135 displayed thereon. At operation 810, the customer kiosk 116 determines that the captured image comprises an image of a machine-readable code. For example, and without limitation, the customer kiosk may include software configured to digitally analyze images captured by the photographic element 224 to identify certain distinctive aspects of the machine-readable code 135.

In one embodiment, the machine-readable code 135 is a QR code. A QR code is a two-dimensional barcode or matrix barcode that is defined by the international standard ISO/IEC 18004:2015. A QR code includes three distinctive marks at the corners of the QR code image and one or more smaller marks proximate the fourth corner to normalize the image for size, orientation, and angle of viewing. In addition, dispersed within the four corners of the QR code are a plurality of small dots that can be converted to binary numbers and validated with an error-correcting algorithm. The binary number includes data that is encoded within the QR code. In one suitable embodiment, the data encoded in the QR code includes the customer's financial account data, such as financial accounts, associated data, financial institutions, and the like. In some instances, the data can include communication preferences and device IDs (e.g., the customer mobile device ID 138). While the machine-readable code 135 described herein is in reference to a QR code, the disclosure contemplates that any type of machine-readable code may be used that enables the system 100 to function as described herein. For example, the machine-readable code 135 may include one or more of one dimensional barcode formats, such as a UPC, code 39, EAN 8, or EAN 13, other two dimensional formats such as PDF417 or Datamatrix, other n-dimensional barcode formats, and/or alphanumeric text or symbols or the like.

After determining that the captured image includes the machine-readable code 135, at operation 812, the customer kiosk 116 decodes the machine-readable code 135 and extracts the customer financial accounts and the respective financial account data associated therewith. As shown in operation 814, the customer kiosk 116 analyzes the customer financial account data to determine each financial institution, such as the financial institutions 106, 108, and 110, that is associated with each respective customer financial account. For example, and without limitation, customer financial account data may include the name of a respective financial institution associated with the account, a bank or issuer identification number, and/or the like.

Based on the identified financial institutions associated with the customer financial account data, at operation 816 the customer kiosk 116 retrieves information associated with one or more financial product offerings that are being offered by the respective financial institutions. For example, and without limitation, the customer kiosk 116 may communicate with the customer service computing system 118 (shown in FIG. 1) to request access to the database 134 (shown in FIG. 1) or may communicate directly with the database 134. As described above, the database 134 includes information associated with the financial products and/or product offerings that a respective financial institution may be offering for new and/or current customers. In some embodiments, information associated with product offerings from other financial institutions may be retrieved, such as competing financial institutions.

At operation 818, the customer kiosk 116 presents to the customer 104 each of the customer's identified financial institutions, for example, via the user interface 12 (shown in FIG. 5). Furthermore, as shown in operation 820, the customer kiosk 116 presents to the customer 104 the customer's financial accounts associated with each of the financial institutions (shown in FIG. 5). As discussed above, each of the presented financial accounts may be presented with an option to choose or otherwise flag an account via the user interface 12. In addition, the customer kiosk 116 presents the financial product offerings associated with each of the financial institutions (shown in FIG. 6). Likewise, each of the financial products offerings may be presented with an option to choose or otherwise flag a product offering via the user interface 12.

In operation 822, the method 800 includes receiving from the customer 104 a selection of one or more of the financial accounts and the financial product offerings. For example, and without limitation, the customer 104 selects those financial accounts and/or financial product offerings via the user interface 12. Furthermore, at an operation 824, the customer kiosk 116 generates the machine-readable transaction code 142, such as a barcode or QR code. In one suitable embodiment, the machine-readable transaction code 142 includes the customer-selected financial accounts and associated customer financial account data, and the customer-selected financial product offerings and respective associated information. In other embodiments, the machine-readable transaction code 142 may include an access credential, which when scanned by another computing device, such as the customer service computing system 118, allows that computing device access to the user-selected financial account data. It is noted that the data encoded in the machine-readable transaction code 142 can be encrypted to provide additional security to the data. The machine-readable transaction code 142 is then presented to the customer 104, for example, via the display (such as the display 220) of the customer kiosk 116.

At operation 826, the customer 104 scans the machine-readable transaction code 142 using his or her customer mobile device 102, and in particular, the Streamline Bank App 114A. After scanning the machine-readable transaction code 142, the customer 104 may end his or her interaction with the customer kiosk 116, for example, by pressing an "END" icon presented via the user interface 12 (shown in FIG. 7). For example, the customer kiosk 116 may present to the customer 104, via the user interface 12, an option to end the transaction. Upon receipt of input from the customer 104, via the user interface 12, requesting to end the transaction, the customer kiosk 116 may remove the machine-readable transaction code 142 from the display and end the transaction.

At operation 828, the customer kiosk 116 transmits to the customer service computing system 118 a copy of the machine-readable transaction code 142, for example as a data file. The copy is used by the customer service computing system 118 to access the customer-selected financial data upon presentation of the machine-readable transaction code 142 by the customer 104. For example, the customer service computing system 118 captures an image of the machine-readable transaction code 142 using a photographic element. The customer service computing system 118 then determines that the captured image is an image of a machine-readable transaction code and compares the captured image to the machine-readable transaction code 142 received from the customer kiosk 116. If the images match, the customer service computing system 118 can extract or access the customer's selected financial accounts/data and user-selected product offerings. In this way, the customer service representative 112 can authenticate the customer 104 by scanning the machine-readable transaction code 142 from the customer mobile device 102. The customer service representative can then provide any services needed or requested by the customer 104 corresponding to those accounts.

Figure 9:
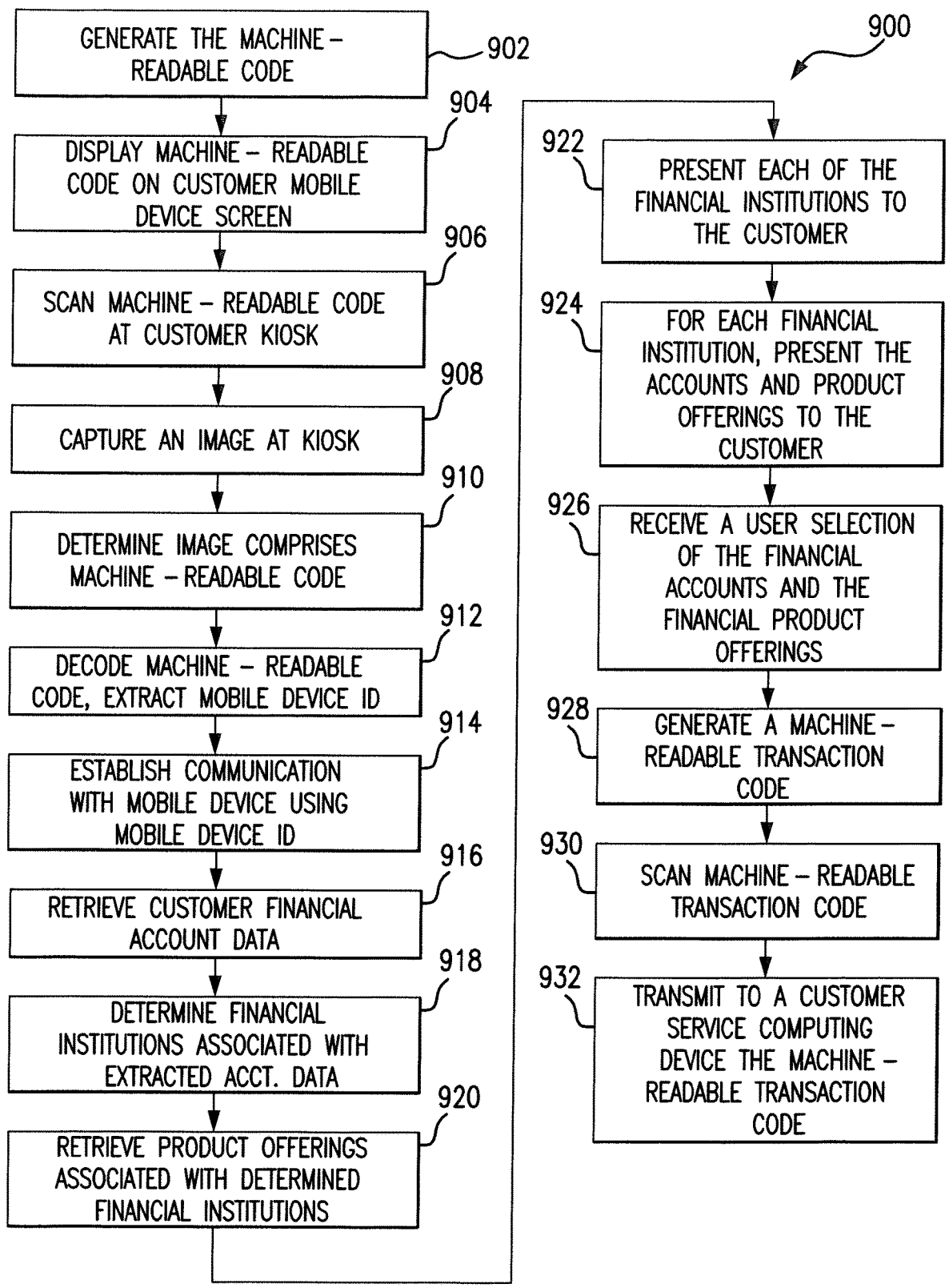
FIG. 9 is a flowchart illustrating an alternative computer-implemented method for enabling a customer, such as the customer shown in FIG. 1, to select and receive service for one or more of the customer's financial accounts at a single location, such as the streamline bank shown in FIG. 1, in accordance with another embodiment of the present disclosure.

FIG. 9 is a flowchart illustrating an alternative computer-implemented method 900 for enabling a customer, such as the customer 104 (shown in FIG. 1), to select and receive service for one or more of the customer's financial accounts at a single location, such as the streamline bank 114 (shown in FIG. 1), in accordance with another embodiment of the present disclosure. The operations described herein may be performed in the order shown in FIG. 9 or, according to certain inventive aspects, may be performed in a different order. Furthermore, some operations may be performed concurrently as opposed to sequentially. In addition, some operations may be optional.

The computer-implemented method 900 is described below, for ease of reference, as being executed by exemplary devices and components introduced with the embodiments illustrated in FIGS. 1-7. In one embodiment, the computer-implemented method 900 may be implemented by the streamline bank 114 using one or more computing devices, such as the customer kiosk 116 and the customer service computing system 118 (each shown in FIG. 1). In the exemplary embodiment, the computer-implemented method 900 relates to receiving aggregated information relating to one or more financial accounts belonging to a customer, including a selection from among the financial accounts for servicing. While operations within the computer-implemented method 900 are described below regarding the customer kiosk 116, the computer-implemented method 900 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

As is described above, the customer 104 installs the financial application 114A (the Streamline Bank App) associated with the streamline bank 114 to his or her customer mobile device 102. The customer 104 executes the financial application 114A and inputs or otherwise provides access to his or her financial applications, such as the financial applications 106A, 108A, and 110A (shown in FIG. 1), and/or financial accounts via webservices provided by his or her financial institutions, such as the financial institutions 106, 108, and 110. Secure access to the multiple financial applications and/or financial accounts may be achieved using a single user credential, such as a biometric sample, as described herein.

After access to the customer's financial accounts is established, for example, by receiving and authenticating the single user credential, financial information is gathered by the financial application 114A to provide aggregated financial services to the customer 104. The aggregated financial services include, for example, and without limitation, allowing the customer 104 and his or her customer service representative 112 to review account activities, balances, transactions, and other financial information associated with the customer's financial accounts. The customer 104 may select an account to discuss with the customer service representative that is specific to that account, and/or may select several accounts to simultaneously view and discuss information associated with the selected multiple financial accounts.

In the example embodiment, the customer 104 visits a streamline bank 114 to receive financial services directed to one or more of his or her financial accounts, and/or to add or open a new financial account. The customer 104 may select any number of his financial accounts and/or financial product offerings for servicing before proceeding to speak with a customer service representative, such as the customer service representative 112 (shown in FIG. 1).

In the exemplary embodiment, the customer 104 approaches the customer kiosk 116 located at the streamline bank 114. At operation 902, the customer 104 instructs the financial application 114A to generate the machine-readable code 135 such as a barcode or quick response (QR) code, that includes, for example, communication information associated with the customer mobile device, such as the customer mobile device ID 138 (shown in FIG. 1), to facilitate in authenticating a wireless connection between the customer mobile device 102 and the customer kiosk 116. At operation 904, the machine-readable code 135 is displayed on the customer mobile device 102, for example, via the display 220.

At operation 906, the customer 104 presents or scans the machine-readable code 135 at the customer kiosk 116. For example, and without limitation, the customer kiosk 116 may detect the presence of the customer 104 and automatically activate the photographic element 224 to capture one or more images. In some embodiments, the customer 104 may interact with the customer kiosk 116 to initiate the scanning operation. For example, the customer 104 may press a button or icon that activates the photographic element 224 to scan the display of the customer mobile device 102.

At operation 908, when the display 220 of the customer mobile device 102 is presented within the field of view of the photographic element 224, the customer kiosk 116 captures one or more images of the machine-readable code 135 displayed thereon. At operation 910, the customer kiosk 116 determines that the captured image comprises an image of a machine-readable code. For example, and without limitation, the customer kiosk may include software configured to digitally analyze images captured by the photographic element 224 to identify certain distinctive aspects of the machine-readable code 135.

After determining that the captured image includes the machine-readable code 135, at operation 912, the customer kiosk 116 decodes the machine-readable code 135 and extracts the customer mobile device ID 138 associated therewith. At operation 914, the customer kiosk 116 establishes communication with the customer mobile device 102, using, in part, the extracted customer mobile device ID 138. For example, and without limitation, the customer kiosk 116 sends an initial signal wirelessly to a transceiver of the customer mobile device 102. The initial signal is processed by the customer mobile device 102 and a response signal, which includes the customer mobile device ID 138, is sent back to the customer kiosk 116. The response signal is processed by customer kiosk 116 and, if the customer mobile device ID 138 received over the wireless connection 136 matches the customer mobile device ID 138 extracted from the machine-readable code 135, a wireless connection 136 is thereby established. In one suitable embodiment, a customer kiosk ID 140 is transmitted to the customer mobile device 102 when the wireless connection 136 is established. The IDs 138 and 140 are used by the customer mobile device 102 and the customer kiosk 116 to verify that information being transmitted by one or the other of the devices is being transmitted to the corrected device.

At operation 916, the customer kiosk 116 retrieves, from the customer mobile device 102, customer financial account data associated with one or more of the customer's financial accounts. For example, the customer kiosk 116 may access and retrieve the customer financial account data from the Streamline Bank App 114A using an API. In such an instance, the customer financial account data is not encoded in the machine-readable code 135 as it is with the method 800 described above. Rather, the machine-readable code 135 is used to facilitate establishing a secure connection between the customer kiosk 116 and the customer mobile device 102. The API connection provides a secure transfer of the customer financial account data between the customer kiosk 116 and the customer mobile device 102. The customer kiosk 116 temporarily stores the customer financial account data, for example, at the database 134 or in its memory, such as the memory device 304 (shown in FIG. 3). It is noted that this data may be encrypted to protect against potential data theft. In addition, the data may be packaged into a single packet, or hash packet, that includes a unique identifier indicating that the data belongs to the customer 104.

As shown in operation 918, the customer kiosk 116 analyzes the customer financial account data to determine each financial institution, such as the financial institutions 106, 108, and 110, that is associated with each respective customer financial account. For example, and without limitation, customer financial account data may include the name of a respective financial institution associated with the account, a bank or issuer identification number, and/or the like.

Based on the identified financial institutions associated with the customer financial account data, at operation 920 the customer kiosk 116 retrieves information associated with one or more financial product offerings that are being offered by the respective financial institutions. For example, and without limitation, the customer kiosk 116 may communicate with the customer service computing system 118 (shown in FIG. 1) to request access to the database 134 (shown in FIG. 1). As described above, the database 134 includes information associated with the financial products and/or product offerings that a respective financial institution may be offering for new and/or current customers.

At operation 922, the customer kiosk 116 presents to the customer 104 each of the customer's identified financial institutions, for example, via the user interface 12 (shown in FIG. 5). Furthermore, as shown in operation 924, the customer kiosk 116 presents to the customer 104 the customer's financial accounts associated with each of the financial institutions (shown in FIG. 5). As discussed above, each of the presented financial accounts may be presented with an option to choose or otherwise flag an account via the user interface 12. In addition, the customer kiosk 116 presents the financial product offerings associated with each of the financial institutions (shown in FIG. 6). Likewise, each of the financial products offerings may be presented with an option to choose or otherwise flag a product offering via the user interface 12.

In operation 926, the method 900 includes receiving from the customer 104 a selection of one or more of the financial accounts and the financial product offerings. For example, and without limitation, the customer 104 selects those financial accounts and/or financial product offerings via the user interface 12. Furthermore, at an operation 928, the customer kiosk 116 generates the machine-readable transaction code 142, such as a barcode or QR code. In one suitable embodiment, the machine-readable transaction code 142 includes data identifying the customer's selection from among the financial accounts and financial product offerings. In addition, the machine-readable transaction code 142 includes the unique identifier corresponding to the stored financial data belonging to the customer, as described above. In other embodiments, the machine-readable transaction code 142 may include an access credential, which when scanned by another computing device, such as the customer service computing system 118, allows that computing device access to the user-selected financial account data. It is noted that the data encoded in the machine-readable transaction code 142 can be encrypted to provide additional security to the data. The machine-readable transaction code 142 is then presented to the customer 104, for example, via the display (such as the display 220) of the customer kiosk 116.

At operation 930, the customer 104 scans the machine-readable transaction code 142 using his or her customer mobile device 102, and in particular, the Streamline Bank App 114A. After scanning the machine-readable transaction code 142, the customer 104 may end his or her interaction with the customer kiosk 116, for example, by pressing an "END" icon presented via the user interface 12 (shown in FIG. 7).

At operation 932, the customer kiosk 116 transmits to the customer service computing system 118 a copy of the machine-readable transaction code 142, for example as a data file. The copy is used by the customer service computing system 118 to access the customer-selected financial data upon presentation by the customer of the scanned machine-readable transaction code 142. For example, the customer service computing system 118 captures an image of the machine-readable transaction code 142 using a photographic element. The customer service computing system 118 then determines that the captured image is an image of a machine-readable transaction code and compares the captured image to the machine-readable transaction code 142 received from the customer kiosk 116. If the images match, the customer service computing system 118 can extract the unique identifier corresponding to the stored financial data belonging to the customer. In this way, the customer service representative 112 can authenticate the customer 104 by scanning the machine-readable transaction code 142 from the customer mobile device 102. The customer service representative can then provide any services needed or requested by the customer 104 corresponding to those accounts and/or financial product offerings. For example, based on the machine-readable transaction code 142, the customer service computing system 118 can retrieve the customer financial account data and/or selected product offerings from the database 134 and/or the memory device of the customer kiosk 116.

It is noted that the streamline bank 114 may charge a fee to the customer 104 for services provided by the customer service representative 112. In such a scenario, the customer service computing system 118 may transmit payment transaction details to the customer 104 via the customer mobile device 102, for example, for presentation to the customer 104 via a display of the customer mobile device 102. The customer mobile device 102 may provide the customer 104 with an option to select a funding source, such as the digital wallet data 226, for funding the transaction. The digital wallet data 226 may be used, for example, by the customer service computing system 118, to process the transaction (i.e., using the payment details in an approval process to approve or deny the transaction) with the interchange network 120 (shown in FIG. 1).

As is understood from the above described methods 800 and 900, the customer 104 who wishes to receive customer services for his financial accounts held at multiple financial institutions, can initiate a service request at a single location by generating and having the customer kiosk 116 reading (e.g., scanning) a machine-readable transaction code, such as a QR code, and then proceeding with selecting among his or her financial accounts and/or financial product offerings using his or her customer mobile device 102. This facilitates the customer 104 having multiple financial accounts serviced by a single customer service representative at a single location rather than needing to visit each of his or her separate financial institutions.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated, unless so stated and/or except as will be readily apparent to those skilled in the art from the description. According to certain aspects of the present invention, structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

What is claimed is:

1. A streamline bank financial network system comprising:
    a database storing information associated with one or more financial product offerings offered by one or more financial institutions;
    a customer service computing system coupled to the database; and
    a customer kiosk coupled to the database and the customer service computing system, said customer kiosk comprising:
      a photographic element; and
      a processor communicatively coupled to said photographic element, said processor programmed to:
        capture image data with the photographic element, the image data being presented on the display of a customer mobile device associated with a customer;
        determine that the captured image data comprises an image of a machine-readable code;
        decode the machine-readable code;
        extract, from the decoded the machine-readable code, customer financial account data associated with one or more financial accounts of one or more financial institutions;
        retrieve from the database the information associated with one or more financial product offerings offered by the one or more financial institutions;
        present to a customer, via the customer mobile device, each of the one or more financial institutions;
        for each of the one or more financial institutions, present to the customer, via the customer mobile device, the respective one or more financial accounts corresponding to the customer financial account data and the respective one or more financial product offerings;
        receive from the customer, via the customer mobile device, a selection of one or more of the following: the financial accounts and the financial product offerings;
        encrypt the customer selection, the customer selection including the customer-selected financial accounts and associated customer financial account data, and the customer-selected financial product offerings and respective associated information from the database; and
        transmit to the customer service computing system the encrypted customer-selection,
    said customer kiosk further comprising a motion sensor, said processor programmed to:
        detect the presence of a customer;
        activate a user interface in response to detecting the customer; and
        receive an input from the customer to activate the photographic element for capturing the image.

2. The streamline bank financial network system in accordance with claim 1,
    said processor further programmed to generate a machine-readable transaction code including the customer selection.

3. The streamline bank financial network system in accordance with claim 2, said customer kiosk further comprising a display, said processor programmed to:
    present on the display, the machine-readable transaction code.

4. The streamline bank financial network system in accordance with claim 2,
    said processor operation of transmitting to the customer service computing system comprising transmitting the machine-readable transaction code to the customer service computing system.

5. The streamline bank financial network system in accordance with claim 2, said customer service computing system comprising:
    a second photographic element; and
    a second processor communicatively coupled to said second photographic element, said second processor programmed to:
        capture a second image with the second photographic element;
        determine that the captured second image comprises an image of a machine-readable code; and
        extract the customer selection from the captured second image.

6. A streamline bank financial network system comprising:
    a database storing information associated with one or more financial product offerings offered by one or more financial institutions;
    a customer service computing system coupled to the database; and
    a customer kiosk coupled to the database and the customer service computing system, said customer kiosk comprising:
      a photographic element; and
      a processor communicatively coupled to said photographic element, said processor programmed to:
        capture image data with the photographic element, the image data being presented on the display of a customer mobile device associated with a customer;

determine that the captured image data comprises an image of a machine-readable code;
decode the machine-readable code;
extract, from the decoded the machine-readable code, customer financial account data associated with one or more financial accounts of one or more financial institutions;
retrieve from the database the information associated with one or more financial product offerings offered by the one or more financial institutions;
present to a customer, via the customer mobile device, each of the one or more financial institutions;
for each of the one or more financial institutions, present to the customer, via the customer mobile device, the respective one or more financial accounts corresponding to the customer financial account data and the respective one or more financial product offerings;
receive from the customer, via the customer mobile device, a selection of one or more of the following: the financial accounts and the financial product offerings;
encrypt the customer selection, the customer selection including the customer-selected financial accounts and associated customer financial account data, and the customer-selected financial product offerings and respective associated information from the database; and
transmit to the customer service computing system the encrypted customer-selection,
said customer service computing system comprising a second processor programmed to:
transmit payment transaction details to a customer mobile device, the payment transaction details corresponding to a payment transaction for rendered services;
receive, from the customer mobile device, digital wallet data for processing the payment transaction; and
process the payment transaction with an interchange network.

7. The streamline bank financial network system in accordance with claim 6,
said customer kiosk further comprising a motion sensor, said processor programmed to detect the presence of a customer and activate the photographic element to capture the image.

* * * * *